United States Patent [19]

Verhoeven

[11] Patent Number: 4,543,605
[45] Date of Patent: Sep. 24, 1985

[54] X-RAY EXAMINATION APPARATUS

[75] Inventor: Leonardus A. J. Verhoeven, Eindhoven, Netherlands

[73] Assignee: U.S. Philips Corporation, New York, N.Y.

[21] Appl. No.: 500,593

[22] Filed: Jun. 2, 1983

[30] Foreign Application Priority Data

Jun. 15, 1982 [NL] Netherlands .......................... 8202418

[51] Int. Cl.[4] .............................................. H04N 7/18
[52] U.S. Cl. ....................................... 358/111; 378/99
[58] Field of Search .......................... 358/111; 378/99; 128/653, 659

[56] References Cited

U.S. PATENT DOCUMENTS

| 3,546,461 | 12/1970 | Craig . | |
|---|---|---|---|
| 3,831,058 | 8/1974 | Van Roosmalen | 315/31 |
| 4,204,225 | 5/1980 | Mistretta | 358/111 |
| 4,335,307 | 6/1982 | De Vries | 358/111 |
| 4,472,826 | 9/1984 | van de Ven | 378/99 |

Primary Examiner—Howard W. Britton
Attorney, Agent, or Firm—Marc D. Schechter

[57] ABSTRACT

In an X-ray image intensifier-television pickup tube apparatus for displaying an image with a small contrast difference, the beam current of the television camera tube can be temporarily increased. As a result, images can be displayed with an increased signal-to-noise ratio. The television camera can then be switched, preferably automatically between this form of image production and the usual production of fluoroscopic images.

11 Claims, 1 Drawing Figure

X-RAY EXAMINATION APPARATUS

BACKGROUND OF THE INVENTION

The invention relates to an X-ray examination apparatus provided with an X-ray image intensifier tube and a television camera tube for recording the image. An electronic circuit is provided for processing the recorded image information.

Such an apparatus adapted for image subtraction has been described in U.S. Pat. No. 4,204,225. In such apparatus there is often a need to be able to provide a diagnostic image in which small contrast differences can be displayed so as to be easily recognizable. For this purpose, it is necessary to be able to amplify the video signals corresponding to these small contrast differences to a sufficient extent.

In conventional television camera tubes, with a maximum signal current of, for example, 200 nA representing brightness peaks in the image and with an amplifier having an equivalent noise current of, for example, 1 to 2 nA, with a bandwidth of, for example, 5 MHz, the signal-to-noise ratio will be from 100 to 200. For producing normal visually observable images, such a signal-to-noise ratio is admissible. However, when sufficient amplification is provided for the smaller contrast differences important for diagnostic purposes, the noise level will be inadmissible.

SUMMARY OF THE INVENTION

It is an object of the invention to provide an X-ray imaging apparatus which is capable of displaying low noise diagnostic images in which small contrast differences can be easily observed without disturbing normal image production. According to the invention, the X-ray imaging apparatus includes means arranged to increase the beam current of the camera tube temporarily for the duration of a selected X-ray exposure.

The resultant temporary increase in the signal current will immediately yield a proportionally better signal-to-noise ratio in the recorded television images. As a result, a correspondingly smaller contrast difference can be displayed with sufficient observability, though possibly with a slight loss of resolving power.

A television camera tube, such as the "Plumbicon" (trademark), is generally adjusted so as to be able to supply a tube current up to approximately 600 nA. This high tube current (high with respect to a maximum signal current of approximately 200 nA to be used for normal television image production) is available to read brightness peaks in a scene projected onto the target of the tube without degrading the image quality. For good image production with comparatively small contrast differences, as is required for the production of difference images, more stringent requirements are imposed on the signal-to-noise ratio. The use of a higher maximum signal current is particularly suitable for producing good difference images. For producing fluoroscopic images in an X-ray image intensifier-TV pickup tube system or a corresponding apparatus for electronic radiography, it is desirable to be able to readjust to the usual lower maximum signal current without requiring further operations.

In a preferred embodiment, the apparatus comprises a camera tube in which the tube current can be further increased, for example up to approximately 1500 nA. As a result, even smaller contrast differences can be displayed, though possibly at the expense of a decrease in the modulation transfer function (MTF). If it is not required that the MTF of the image should always be optimum, the value of the beam current can now be chosen so that for each individual case an optimum compromise is reached between the MTF and the minimum contrast differences to be displayed.

Due to the fact that in an apparatus according to the invention the signal current is increased only for a very short time, the integrated cathode loading and the integrated target loading will not be materially higher for camera tubes subjected to an increased beam current. As a result, the life of the camera tube will not be shortened appreciably.

A favorable camera tube for use in an apparatus according to the invention is a tube provided with a diode gun as described in U.S. Pat. No. 3,831,058.

In an apparatus according to the invention, it suffices to use a single television camera system. This single system can be automatically or manually switched between displaying normal visual images and displaying images with small contrast differences and increased signal-to-noise ratios. An embodiment according to the invention comprises means for measuring a maximum local exposure intensity and to adapt thereto an admissible degree of exposure. In this case, one may use peak video signal values or mean brightness values. Mean brightness values may be obtained from the video signal or, by means of a photometer, directly from the image to be recorded.

DESCRIPTION OF THE PREFERRED EMBODIMENTS

Figure 1:
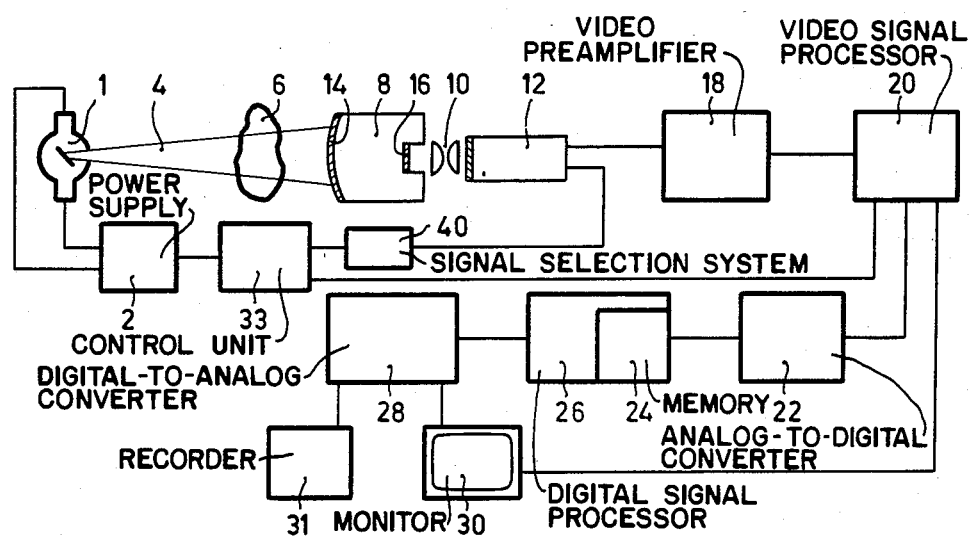
FIG. 1 is a block diagram of an X-ray examination apparatus according to the invention.

The apparatus shown in FIG. 1 comprises an X-ray tube 1 with a power supply 2. Tube 1 produces an X-ray beam 4 for irradiating an object 6.

With respect to the object 6 to be irradiated, there is arranged opposite the X-ray source 1 an X-ray image intensifier tube 8. Tube 8 is coupled by means of a lens system 10 to a television camera tube 12.

The X-ray image intensifier tube 8 comprises an input screen 14. Screen 14 is formed in the usual manner with a luminescent screen and a photocathode. Tube 8 also has an output screen 16 provided on an output window. Screen 16 also has a luminescent layer in which electrons emitted by the photocathode form a fluoroscopic image. The fluoroscopic image formed on output screen 16 is recorded by the camera tube 12 and is converted into a video signal. The video signal is supplied to a video preamplifier 18. The preamplified video signal is supplied to a video signal processor 20. The video signal processor is connected to an analog-to-digital converter 22. Digitized video signals are supplied from converter 22 to a digital signal processor 26. Processor 26 is provided with a memory 24. Memory 24 preferably has at least two image stores for image subtraction. Digital video signals produced or composed in processor 26 are supplied to a digital-to-analog converter 28. The output of converter 28 is connected to a monitor 30, to display the image, and a recorder 31 such as a video disc recorder or a device using a digital disc.

The power supply 2 for the X-ray tube is controlled from a central control unit 33.

According to the invention, the exposure of the camera tube is controlled by the central control unit 33 so that when recording a selected X-ray exposure, i.e. during a short strong X-ray pulse, the maximum signal current in the camera tube can become substantially equal to the maximum beam current to be supplied therein. For example, by modifying potentials applied to the electrodes of the electron gun of the camera tube, the maximum beam current can temporarily reach a higher value. It is advantageous to use a camera tube provided with a diode gun in this arrangement.

For adjusting the duration of this modified exposure, a signal selection system 40 can be provided. By means of this system 40, the light intensity of a part of an image, for example, can be measured. Starting with this value, the exposure duration for the image to be recorded can be adjusted. In another embodiment of this system, video signals can be selected for controlling exposure duration.

What is claimed is:

1. An X-ray examination apparatus comprising:
   an X-ray image intensifier tube having an output screen for forming a visible image of an object irradiated with X-rays;
   a television camera tube arranged to pick up the visible image formed at the output screen and for generating a video signal representing the visible image, said tube having a beam current; and
   means for increasing the beam current of the camera tube during a selected X-ray exposure duration.

2. An X-ray examination apparatus as claimed in claim 1, characterized in that the apparatus further comprises electronic processing means for processing the video signal to form a signal representing the difference between two successive images of the object.

3. An X-ray examination apparatus as claimed in claim 1, characterized in that the television camera tube can provide a maximum beam current of at least 1,000 nA.

4. An X-ray examination apparatus as claimed in claim 3, characterized in that the television camera tube comprises a diode electron gun for generating the beam current.

5. An X-ray examination apparatus as claimed in claim 4, characterized in that when the beam current is increased, the signal-to-noise ratio of the television camera tube is also increased.

6. An X-ray examination apparatus as claimed in claim 5, characterized in that the apparatus further comprises electronic processing means for processing the video signal to form a signal representing the difference between two successive images of the object.

7. An X-ray examination apparatus as claimed in claim 1, characterized in that the apparatus further comprises a signal selection system for controlling the duration of the X-ray exposure.

8. An X-ray examination apparatus as claimed in claim 7, characterized in that the television camera tube can provide a maximum beam current of at least 1,000 nA.

9. An X-ray examination apparatus as claimed in claim 8, characterized in that the television camera tube comprises a diode electron gun for generating the beam current.

10. An X-ray examination apparatus as claimed in claim 9, characterized in that when the beam current is increased, the signal-to-noise ratio of the television camera tube is also increased.

11. An X-ray examination apparatus as claimed in claim 10, characterized in that the apparatus further comprises electronic processing means for processing the video signal to form a signal representing the difference between two successive images of the object.

* * * * *